(12) United States Patent
Arachchi

(10) Patent No.: US 11,089,447 B2
(45) Date of Patent: Aug. 10, 2021

(54) METHOD FOR AUTOMATICALLY CONFIGURING A MOBILE RADIO

(71) Applicant: Tait International Limited, Christchurch (NZ)

(72) Inventor: Thilina Mallawa Arachchi, Christchurch (NZ)

(73) Assignee: Tait International Limited

( * ) Notice: Subject to any disclaimer, the term of this patent is extended or adjusted under 35 U.S.C. 154(b) by 0 days.

(21) Appl. No.: 16/904,464

(22) Filed: Jun. 17, 2020

(65) Prior Publication Data

US 2021/0076169 A1 Mar. 11, 2021

Related U.S. Application Data

(60) Provisional application No. 62/286,496, filed on Jun. 17, 2019.

(51) Int. Cl.
*H04W 4/10* (2009.01)
*H04W 4/02* (2018.01)
*H04W 4/021* (2018.01)
*H04W 4/08* (2009.01)

(52) U.S. Cl.
CPC .............. *H04W 4/10* (2013.01); *H04W 4/021* (2013.01); *H04W 4/027* (2013.01); *H04W 4/08* (2013.01)

(58) Field of Classification Search
CPC ....... H04W 4/02; H04W 4/021; H04W 4/027; H04W 4/06; H04W 4/08; H04W 4/10
See application file for complete search history.

(56) References Cited

U.S. PATENT DOCUMENTS

| | | | | |
|---|---|---|---|---|
| 2003/0016632 A1* | 1/2003 | Refai | ................... | H04W 84/08 370/260 |
| 2005/0181726 A1* | 8/2005 | Gottlieb | .............. | H04M 1/2745 455/41.2 |
| 2007/0266077 A1* | 11/2007 | Wengrovitz | ............ | H04W 4/10 709/203 |
| 2008/0125059 A1* | 5/2008 | Schultz | ................... | H04W 4/10 455/90.2 |
| 2014/0019873 A1* | 1/2014 | Gupta | ..................... | G06F 9/451 715/744 |
| 2014/0315502 A1* | 10/2014 | Lassally | ................... | H04B 1/44 455/90.2 |

* cited by examiner

*Primary Examiner* — Siu M Lee
(74) *Attorney, Agent, or Firm* — Run8 Patent Group, LLC; Peter Miller; Alexander R. Flake

(57) ABSTRACT

A method for configuring a mobile radio includes: accessing an initial button configuration assigning a first group to a first push-to-talk button; and accessing a first trigger condition; loading the initial button configuration onto the mobile radio at a first time; in response to detecting activation of the first push-to-talk button at a second time succeeding the first time, initiating communication between the mobile radio and the first group; accessing a set of contextual data; in response to detecting first trigger condition based on the set of contextual data, generating a second group based on the set of contextual data and assigning the second group to the first push-to-talk button at a third time; and in response to detecting activation of the first push-to-talk button at a fourth time succeeding the third time, initiating communication between the mobile radio and the second group.

20 Claims, 5 Drawing Sheets

METHOD FOR AUTOMATICALLY CONFIGURING A MOBILE RADIO

CROSS-REFERENCE TO RELATED APPLICATIONS

This application claims the benefit of U.S. Provisional Application No. 62/862,496, filed on 17 Jun. 2019, which is incorporated in its entirety by this reference.

TECHNICAL FIELD

This invention relates generally to the field of radio communications and more specifically to a new and useful method for automatically configuring a mobile radio in the field of radio communications.

DESCRIPTION OF THE EMBODIMENTS

The following description of the embodiments of the invention is not intended to limit the invention to these embodiments but rather to enable a person skilled in the art to make and use this invention.

1. Method

Figure 2:
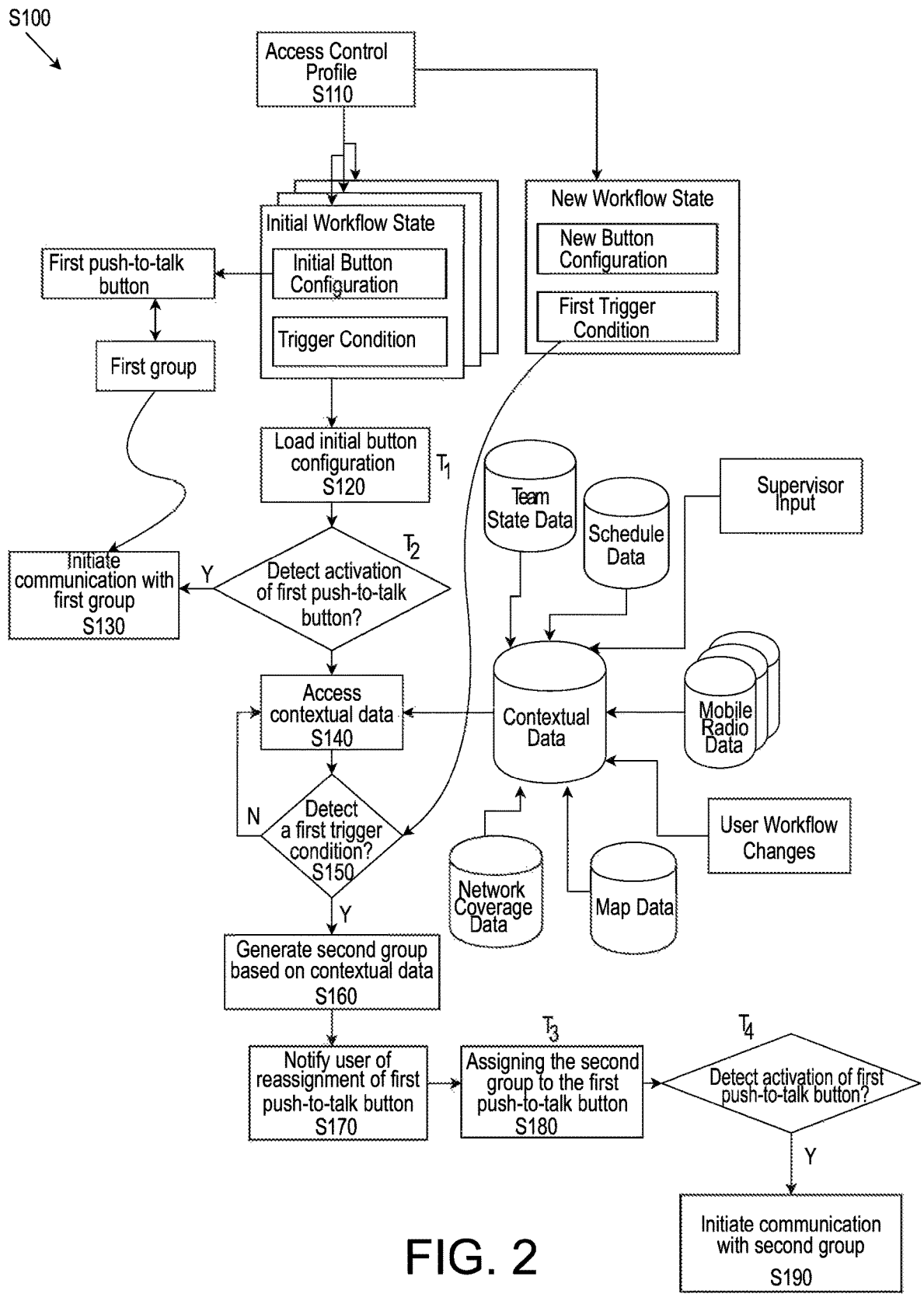
FIG. 2 is a flowchart representation of one variation of the method.

As shown in FIG. 2, a method S100 for automatically configuring a mobile radio includes accessing a control profile including: an initial button configuration assigning a first group to a first push-to-talk button of the mobile radio; and a set of trigger conditions for reconfiguring the mobile radio in Block S110. The method S100 also includes: loading the initial button configuration onto the mobile radio at a first time in Block S120; in response to detecting activation of the first push-to-talk button at a second time succeeding the first time, initiating communication between the mobile radio and the first group in Block S130; accessing a set of contextual data representing an operational scenario of the mobile radio in Block S140; and detecting a first trigger condition, in the set of trigger conditions, based on the set of contextual data in Block S150. The method S100 further includes, in response to detecting the first trigger condition: generating a second group based on the set of contextual data in Block S160; notifying a user of the mobile radio of reassignment of the first push-to-talk button in Block S110; and assigning the second group to the first push-to-talk button at a third time in Block S180. The method S100 also includes, in response to detecting activation of the first push-to-talk button at a fourth time succeeding the third time, initiating communication between the mobile radio and the second group in Block S190.

Figure 3:
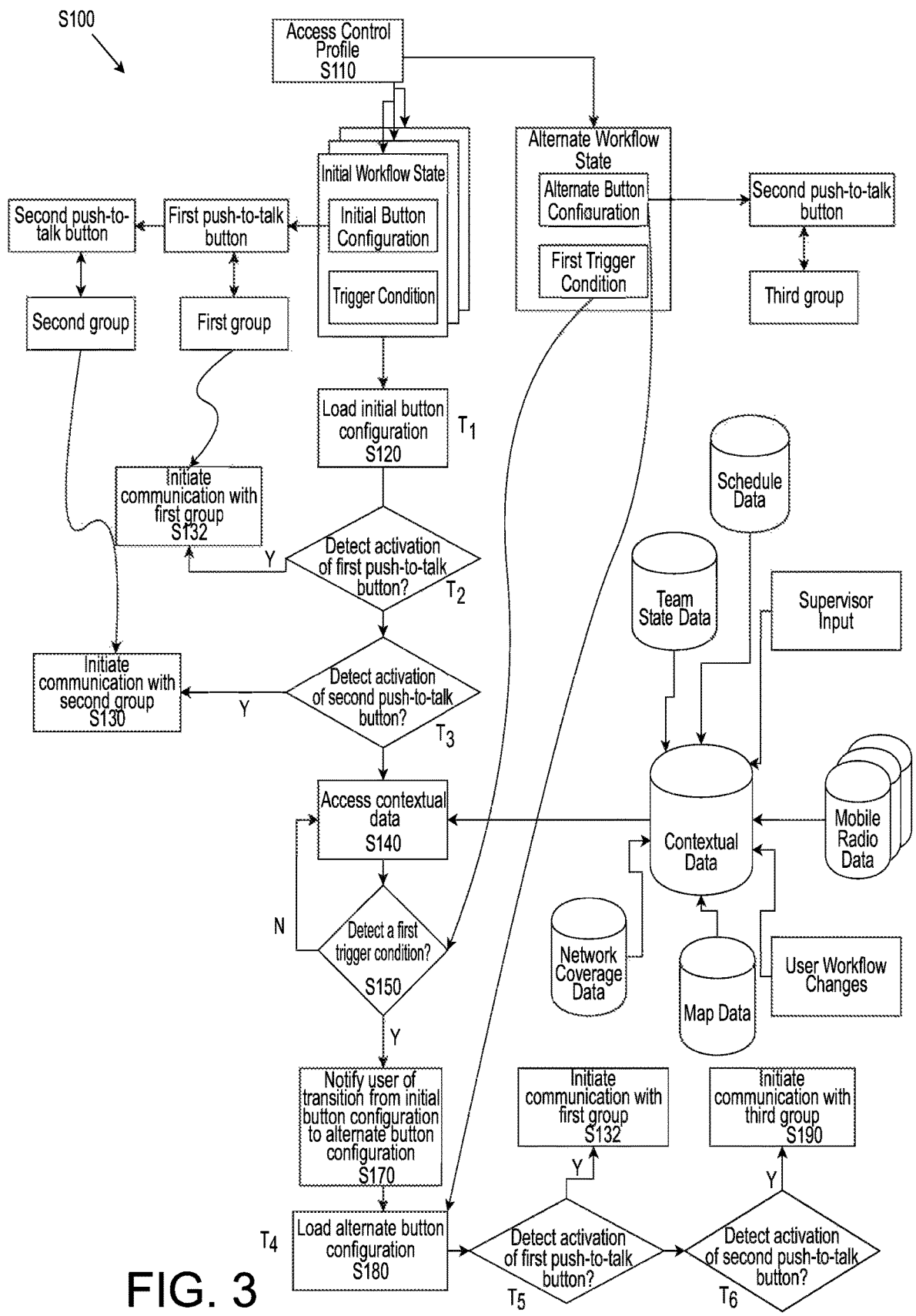
FIG. 3 is a flowchart representation of one variation of the method.

As shown in FIG. 3, one variation of the method S100 includes accessing a control profile comprising: an initial button configuration assigning a first group to a first push-to-talk button of the mobile radio and assigning a second group to a second push-to-talk button of the mobile radio, the second group comprising a first subset of the first group; a first alternate button configuration assigning a third group to the second push-to-talk button, the third group comprising a second subset of the first group different from the first subset; and a set of trigger conditions comprising a first trigger condition corresponding to the first alternate button configuration in Block S112. This variation of the method S100 also includes: loading the initial button configuration onto the mobile radio at a first time in Block S120; in response to detecting activation of the first push-to-talk button at a second time succeeding the first time, initiating communication between the mobile radio and the first group in Block S132; in response to detecting activation of the second push-to-talk button at a third time succeeding the first time, initiating communication between the mobile radio and the second group in Block S130; accessing a set of contextual data representing an operational scenario of the mobile radio in Block S140; and detecting the first trigger condition based on the set of contextual data in Block S150. This variation of the method S100 further includes, in response to detecting first trigger condition: notifying the user of the transition from the initial button configuration to the first alternate button configuration in Block S110; and loading the first alternate button configuration onto the mobile radio at a third time in Block S180. This variation of the method S100 also includes: in response to activation of the first push-to-talk button at a fourth time succeeding the third time, initiating communication with the first group in Block S192; and in response to activation of the second push-to-talk button at a fifth time succeeding the third time, initiating communication with the third group in Block S190.

Figure 4:
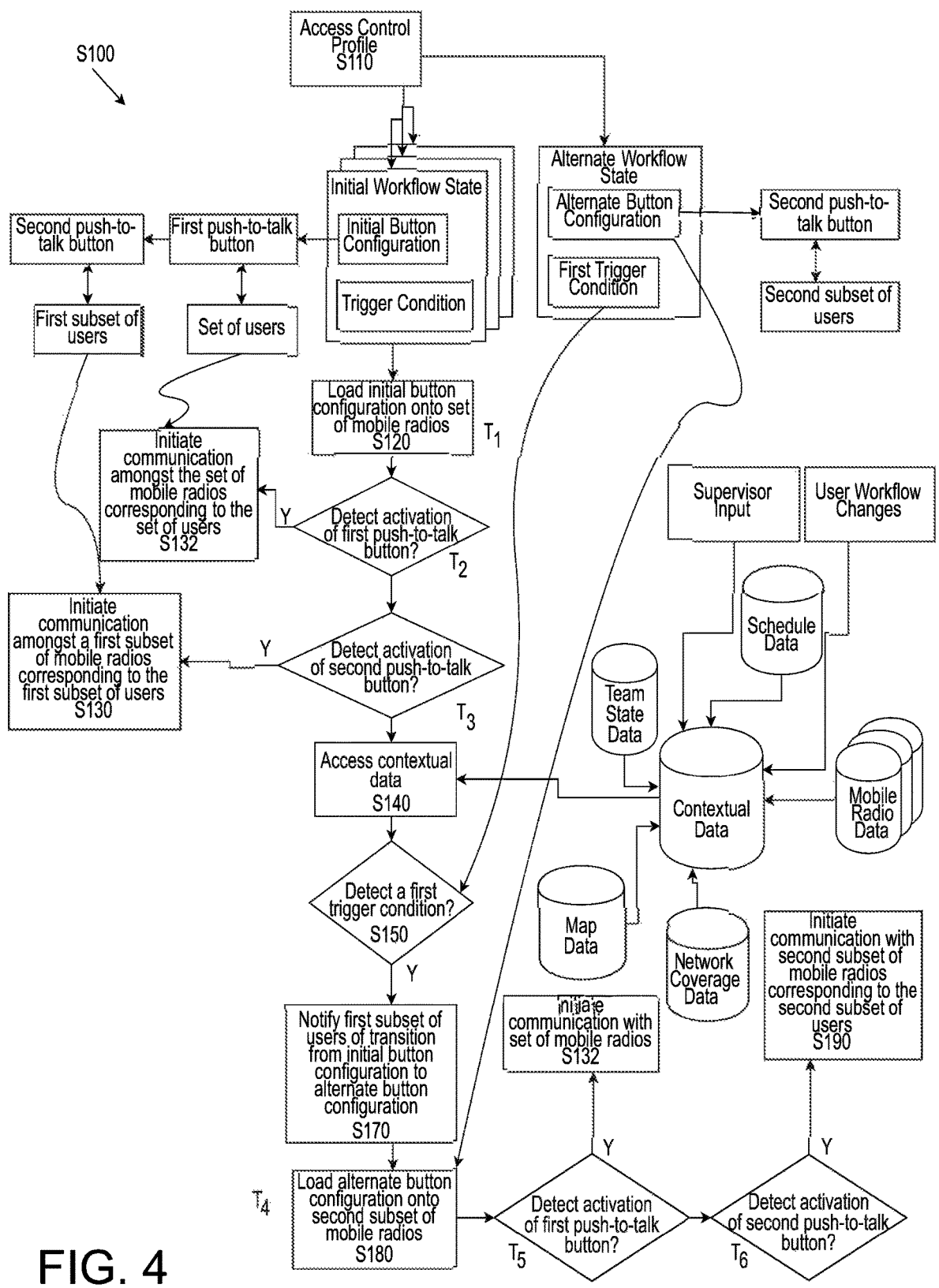
FIG. 4 is a flowchart representation of one variation of the method.
Figure 5A:
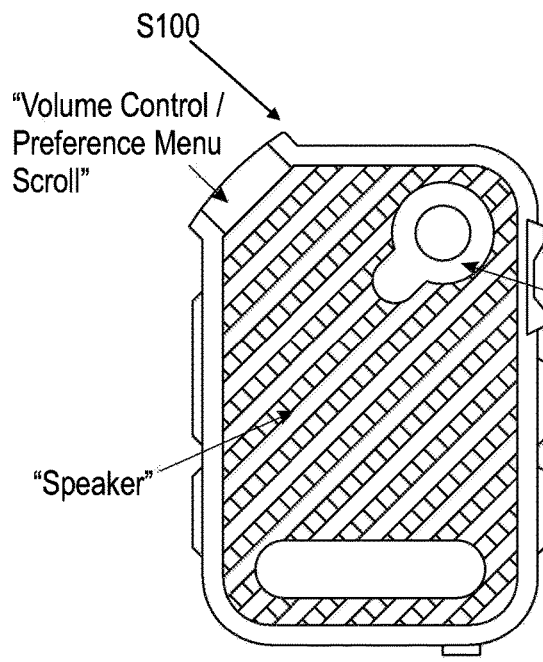
FIGS. 5A-5D are a schematic representations of one variation of the method.
Figure 5B:
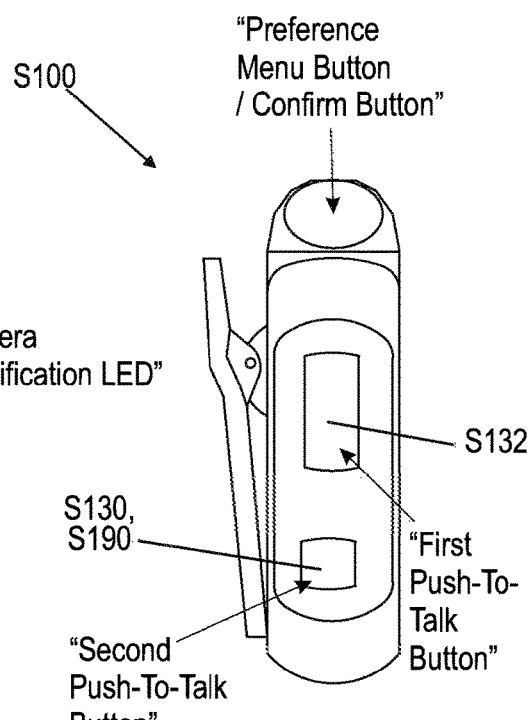
Figure 5C:
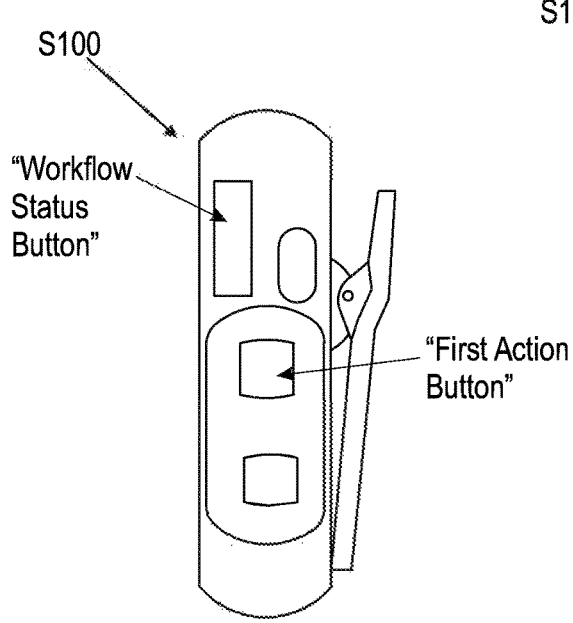
Figure 5D:
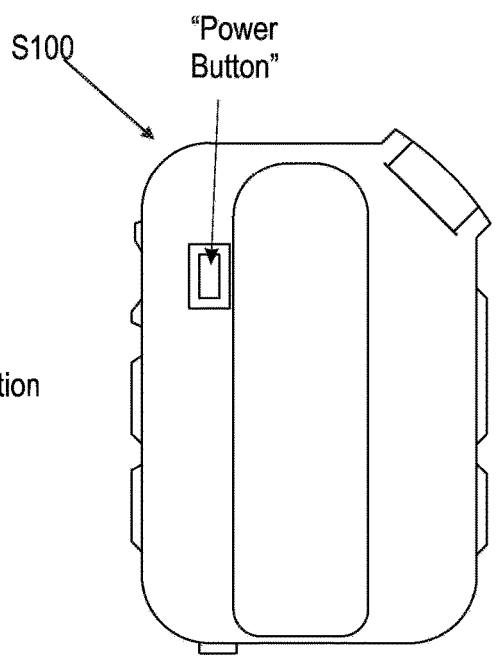

As shown in FIG. 4, one variation of the method S100 includes accessing a control profile comprising: an initial button configuration assigning a set of users, of the set of mobile radios, to a first push-to-talk button of each radio in the set of mobile radios and assigning a first subset of users in the set of users, of a first subset of mobile radios in the set of mobile radios, to a second push-to-talk button of each mobile radio in the set of mobile radios; and a set of trigger conditions comprising a first trigger condition corresponding to a new button configuration in Block S110. This variation of the method S100 also includes: at a first time, loading the initial button configuration onto the set of mobile radios in Block S120; in response to detecting activation of the first push-to-talk button of a first mobile radio in the set of mobile radios at a second time succeeding the first time, initiating communication amongst the set of mobile radios in Block S132; in response to detecting activation of the second push-to-talk button of a second mobile radio in the set of mobile radios at a third time succeeding the first time, initiating communication amongst the first subset of mobile radios in Block S130; accessing a set of contextual data associated with an operational scenario of the set mobile radios in Block S140; and detecting the first trigger condition based on the set of contextual data in Block S150. This variation of the method S100 further includes, in response to detecting the first trigger condition: notifying the first subset of users of a transition from the initial button configuration to the new button configuration, the new button configuration assigning a second subset of users of a second subset of mobile radios in the set of mobile radios to the second push-to-talk button in Block S110; and, at a fourth time, loading the new button configuration onto the second subset of mobile radios in Block S180. This variation of the method S100 also includes: in response to detecting activation of the first push-to-talk button of a third mobile radio in the set of mobile radios at a fifth time succeeding the fourth time, initiating communication amongst the set of mobile radios in Block S192; and, in response to detecting activation of the second push-to-talk button of a third mobile radio in the second subset of mobile radios at a sixth time succeeding the fourth time, initiating communication amongst the second subset of mobile radios in Block S190.

2. Applications

Figure 1:
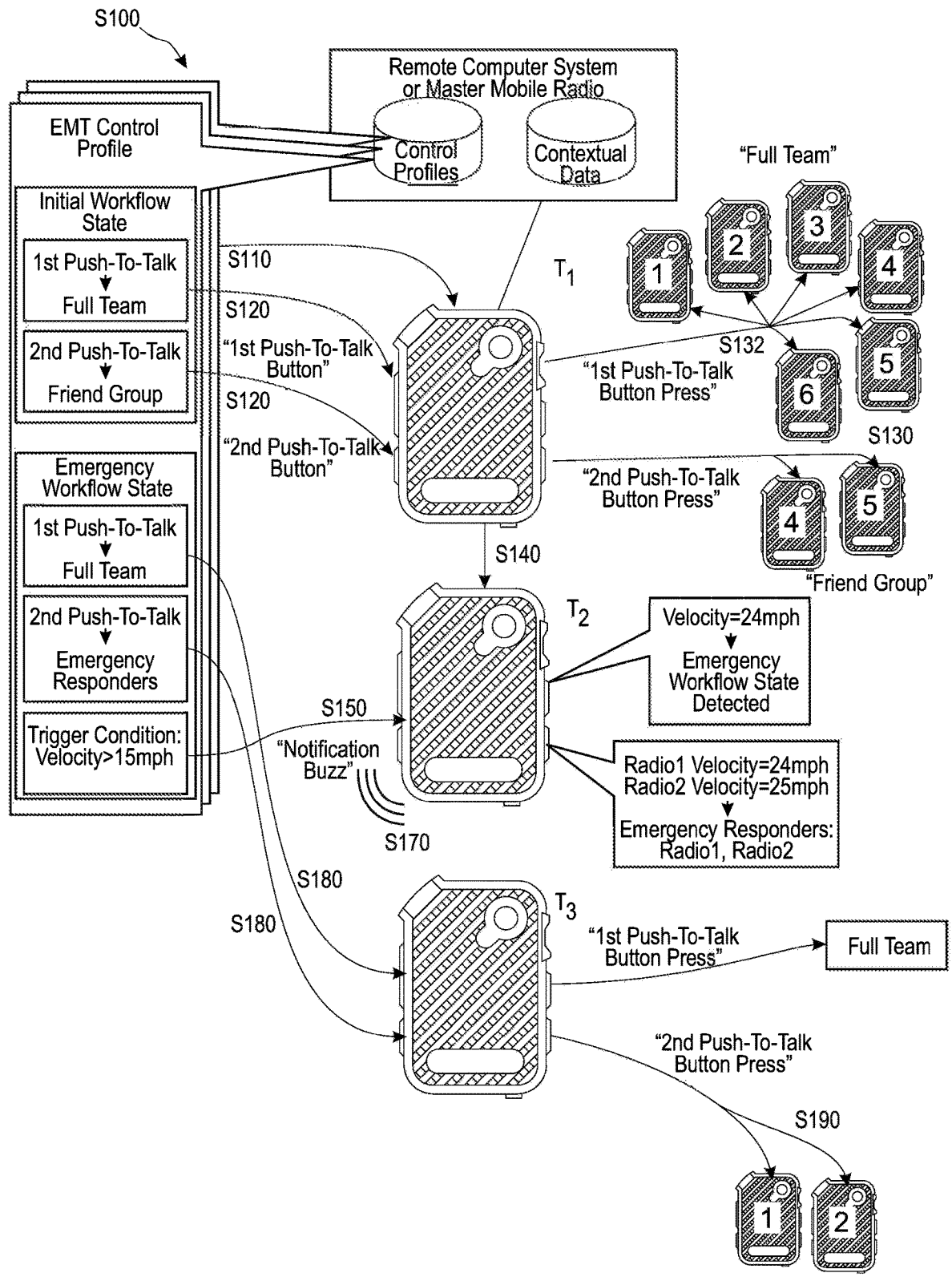
FIG. 1 is a flowchart representation of a method.

Generally, as shown in FIG. 1, an individual mobile radio and/or a remote computer system can execute Blocks of the method S100 to: monitor changes in local scenarios and in communications in a network of mobile radios; predict high-need or high-relevance communication functions for a user of the mobile radio—which may otherwise reside in sub-menus at the mobile radio-based on these changes; and to preemptively and automatically reconfigure direct-access inputs (e.g., reconfigurable "action buttons") on the mobile radios according to these high-need communication functions. The mobile radio can also execute Blocks of the method to indicate such automatic input reconfigurations to the user, such as through haptic and/or audible cues, thereby both enabling the user to quickly access high-need or high-relevance communication functions and affirming a local contextual change to the user.

In particular, a mobile radio (or a remote computer system) can access contextual data from a mobile radio or a network of mobile radios deployed to a scene or location, such as: mobile radio locations; mobile radio motion (e.g., velocities; accelerations); communication frequency and/or duration between mobile radios in the network; voice energy of a communication channel between the mobile radios in the network; a number of mobile radios in the network; a time of day; a team schedule; and/or an identity of a user assigned to the mobile radio. The mobile radio (or the remote computer system) can then predict high-need or high-relevance communication functions based on these contextual data and adapt the functions assigned to direct-action "action buttons" on a mobile radio accordingly, thereby: enabling the user to immediately access most-needed functions at the mobile radio at most (or all) times without navigating through a menu or performing multiple inputs to the mobile radio; increasing accessibility of the mobile radio; improving efficiency of the user when interfacing with the mobile radio; and preserving the user's focus on immediate tasks (e.g., by eliminating distractions related to function searches), such as during a coordinated team-based activity (e.g., an emergency medical response, a firefighting event, a policing or military operation, construction).

The mobile radio can include: push-to-talk buttons that, upon activation, initiate wireless communication with groups (i.e., groups of users operating other mobile radios) assigned to the push-to-talk buttons; and action buttons that, upon activation, execute actions assigned to the action buttons, such as initiating a one-to-one call, marking (or communicating via text-to-speech) a current GPS location of the mobile radio, declaring an emergency, etc. Thus, the system can automatically (e.g., without distracting the user from her current task) reconfigure groups assigned to push-to-talk buttons of a mobile radio and/or functions assigned to action buttons of the mobile radio in response to particular conditions represented by contextual data accessed by the system in order to facilitate effective hands-free and heads-up communication between team members in attention-demanding roles (e.g., SWAT team leader, Emergency Medical Technician or "EMT," firefighter).

In one example of the method S100, the system can: initially assign a first group to a push-to-talk button of the mobile radio; and define a set of trigger conditions for loading a new button configuration onto the mobile radio. The system can then load the initial button configuration onto the mobile radio and, while the initial button configuration is loaded onto the mobile radio, the system can initiate communication between the mobile radio and the first group in response to detecting a button press (i.e. activation) of the push-to-talk button. During operation, the system can continuously access an updated set of contextual data associated with the mobile radio and the network of mobile radios; and, in response to detecting the set of trigger conditions in the set of contextual data, reconfigure the push-to-talk button to assign a new, more relevant group given the current operational scenario of the network of mobile radios. Thus, the system can, without user intervention, select members of this new group predicted to be most relevant for the current context of the user and update the group assigned to the push-to-talk button of the mobile radio, thereby enabling the user to directly communicate with this new and relevant group via a single press of the second push-to-talk button.

Additionally, the system can reconfigure functions assigned to one or more action buttons of the mobile radio. For example, the mobile radio can initially assign a one-to-one calling function to an action button. Therefore, in response to a user pressing the action button, the mobile radio can initiate a one-to-one call with a supervisor, team lead, dispatcher, or any other member of the team. However, upon detecting a corresponding set of trigger conditions—such as detecting that the GPS location of the mobile radio is within a designated emergency response area, the mobile radio can reassign the functionality of the action button to instead transmit a waypoint or marked location representing the current location of the mobile radio to a supervisor. Thus, the mobile radio can automatically surface critical functions of the mobile radio based on the current context of the mobile radio.

Furthermore, the mobile radio can include multiple sets of trigger conditions corresponding to particular workflow states of the user. The mobile radio can then, upon detecting these trigger conditions, reconfigure according to the high-relevance functions and groups for the user in each state. For example, in an EMT application, the mobile radio can define a set of trigger conditions corresponding to a dispatch workflow state (for initial dispatch to an emergency location), a response workflow state (for responding to a medical emergency at the emergency location), and a recovery state (for transporting a patient back to a healthcare facility). Each of these workflow states can include a corresponding set of trigger conditions and a corresponding button configuration amongst which the mobile radio can transition in response to changing conditions detected in the field. Thus, the mobile radio can automatically reconfigure the functionality of its buttons according to the detected workflow state of the user operating the mobile device without direct input from the user, thereby enabling the user to focus on the task at hand.

Blocks of the method S100 are described herein as executed by an individual mobile radio. However, Blocks of the method S100 can additionally or alternatively be executed by a companion application, a supervisor portal, a remote computer system, or a master mobile radio in control of the configuration of multiple other mobile radios operating on a shared network.

Blocks of the method S100 are described herein in relation to an "operational scenario" of the mobile radio. The "operational scenario" describes the current surrounding environment and context of the mobile radio. For example, the operational scenario of a mobile radio can include a firefighting operation and, therefore, contextual data drawn from this operational scenario can include a map of a burning building and the surrounding area, data from each mobile radio present on the scene, locations of various water hydrants, etc. Thus, the mobile radio can access contextual data associated with the operational scenario of the mobile radio, which may change based on the target application of the mobile radio.

3. Mobile Radio

Blocks of the method S100 can be executed by the mobile radio: to receive and transmit audio communications to other mobile radios in the network of mobile radios; to record contextual data via a set of onboard sensors; to access contextual data from a remote computer system or from other mobile radios in the network of mobile radios; and to load various button configurations, for push-to-talk buttons and action buttons, in response to detecting the trigger conditions corresponding to these button configurations. More specifically, the mobile radio can execute these Blocks of the method S100: to predict particular workflow states of the user; and to assign functions of the mobile device to hardware-implemented physical buttons of the mobile radio that are otherwise accessible via multiple inputs by the user (e.g., within a menu hierarchy or other graphical user interface displayed on the mobile radio).

In one variation, Blocks of the method S100 can be executed by a master mobile radio in the network of mobile radios and/or by a remote computer system (e.g., a remote server, a computer network) to coordinate button configuration changes across multiple mobile radios in the network of mobile radios in order to improve coordination between multiple members of a team. For example, a remote computer system can receive contextual data recorded by the network of mobile radios; detect a trigger condition based on the contextual data; and simultaneously update the button configurations of multiple mobile radios in accordance with the detected trigger conditions. Alternatively, the above steps can be executed by a master mobile radio. Thus, the remote computer system or the master mobile radio can maintain seamless communication between members of a team and a changing operational environment.

In one implementation, a mobile radio includes: a cellular transceiver and a local area networking transceiver that support full-duplex, digital transmission of audio communications with other devices (e.g., other mobile radios within the network, a dispatcher); a geospatial position sensor configured to detect the geospatial location of the mobile radio; an audio output, such as in the form of an integrated speaker, an audio output jack, and/or a short-range wireless audio transmitter; a volume control, such as in the form of a knob or buttons; a microphone (or other sensor); a local memory; and a controller configured to execute Blocks of the method S100. The mobile radio can also include a display configured to render visual prompts for the user, graphical user interfaces (hereinafter "GUI") for the user, and/or a haptic module configured to output haptic prompts (e.g., vibrations) to the user, such as to notify the user of a change in button configuration. Thus, in this implementation, the mobile radio can receive audio communications in digital format over the cellular transceiver and/or over the local area network transceiver and can output these audio communications via the integrated speaker or over a connected device.

In one variation, the mobile radio also includes a land mobile radio transceiver configured to support half-duplex person-to-person voice communications over a radio channel, such as within a VHF or UHF band. For example, radio base stations (e.g., repeaters)—such as including towers and antennas—can be installed within a building, throughout a campus, or within a geographic region to form a private land mobile network that supports low-bandwidth half-duplex communications between radio devices. Thus, in this implementation, the mobile radio can: receive audio communications in digital format (via the cellular transceiver and/or over the local area networking transceiver) and/or in analog format (via the land mobile radio transceiver); and output these audio communications via the integrated speaker or over a connected device.

Alternatively, the mobile radio can include an input audio jack configured to connect to a legacy land mobile radio device (hereinafter a "land mobile radio device"). In this implementation, the land mobile radio device can: receive audio communication in analog format over a land mobile radio network and output these audio communications via its integrated speaker. Likewise, the mobile radio can transmit audio signals recorded by an integrated microphone of the mobile radio to the land mobile radio device for analog transmission to other land mobile radio devices.

Therefore, the mobile radio can include various communication functionalities: cellular communication technologies (e.g., to enable cellular communications between mobile radios over one or multiple cellular networks); wireless data communication technologies (e.g., to send and receive, text, audio, video, and controls data over IEEE 802.11 protocols); and/or full-duplex radio communication technologies. Additionally, the mobile radio can also operate near-field communication (hereinafter "NFC") technology to share button configuration data or other data across short distances. Additionally or alternatively, the mobile radio can be connected to a mobile computing device, such as a smartphone, tablet, or other mobile computing device to access various functionality integrated into the mobile computing device, such as location services, cellular connectivity, and a digital display.

3.1 Sensor Suite

Generally, the mobile radio can include a sensor suite in order to record contextual data associated with the mobile radio. More specifically, the mobile radio can include a GPS unit or another global navigation satellite service unit (e.g., to record a geospatial location of a mobile radio within a predefined geospatial coordinate system), an accelerometer and/or a gyroscope (e.g., to record the movement and orientation of the mobile radio), and/or a magnetometer (e.g., to record the compass heading of the mobile radio). Thus, the mobile radio can collect contextual data from its sensor suite in order to detect trigger conditions based on these sensor data or to transmit these locally-recorded contextual data to a master mobile radio and/or a remote computer system.

The mobile radio can also connect to other sensors and/or devices carried or worn by a user, such as via a wired connection or wireless connection (e.g., via a local ad hoc wireless network hosted by the mobile radio). For example, the mobile radio can: connect to a personal alert safety system (hereinafter "PASS") worn by a firefighter to monitor whether the firefighter has entered a harmful environment or is focusing on the task at hand rather than an inbound audio communication; and can return such workflow state of the firefighter to other devices on the same network.

3.2 Push-To-Talk Buttons

Generally, as shown in FIGS. 5A-5D, the mobile radio can include a push-to-talk button that, upon being pressed by a user, causes the mobile device to initiate communication between the mobile radio and a group of users according to the button configuration of the mobile radio. More specifically, upon detecting depression of the push-to-talk button, the mobile radio can: activate the microphone of the mobile radio; and stream (via one of the wireless communication modes described above) audio data collected at the microphone to a set of mobile radios currently assigned to the group of users corresponding to the push-to-talk button. For example, the mobile radio can load a button configuration assigning a group including three users to a first push-to-talk button. Upon activation of this push-to-talk button, the mobile radio can: identify a set of mobile radios currently assigned to these three users; and transmit audio data recorded at the integrated microphone of the mobile radio to the set of mobile radios. Thus, the mobile radio can include one or more push-to-talk buttons to enable instant communication with one or more discrete groups of users.

In one implementation, the mobile radio can include a first (e.g., primary) push-to-talk button and a second (e.g., secondary) push-to-talk button, thereby enabling instant communication between two distinct groups of users within a team. In another implementation, the mobile radio can adaptively switch between button configurations that assign the primary push-to-talk button to a first group, while adaptively modifying the group assigned to the second button based on contextual data accessible to the mobile radio. For example, the mobile radio can load a button configuration corresponding to a detected workflow state of the user such that the second push-to-talk button connects the user of the mobile radio with a group of other users that are relevant to the current workflow state of the user. Thus, in this implementation, the second push-to-talk button functions as an adaptive push-to-talk button enabling easily accessible communication to contextually relevant users within a team, while the first push-to-talk button connects the user with a predictable group that does not change based on context. However, the mobile radio can include fewer or additional push-to-talk buttons and can assign contextually aware groups to any of these push-to-talk buttons.

3.3 Action Buttons

Generally, as shown in FIGS. 5A-5D, the mobile radio can include an action button that, upon depression by a user, causes the mobile radio to execute a function that is relevant to the current context of the user. More specifically, the mobile radio can, upon detecting activation of the action button: access the current button configuration loaded onto the mobile radio; identify the function assigned to the action button in accordance with the button configuration; and execute this function. For example, the mobile radio can load a button configuration that assigns a one-to-one calling function to the action button. Therefore, upon activation of the action button, the mobile device can display a menu from which the user may select a contact with which to initiate a one-to-one call. However, the mobile radio can modify the functionality of the action button based on the current button configuration loaded onto the mobile device. Thus, by continuously updating the assigned functionality of the action button in response to contextual data, the mobile radio can make contextually relevant functions of the mobile radio readily available to a user via a single button press (as opposed to the multiple button press required to access the function via a GUI).

In one implementation, the mobile radio includes two action buttons. For example, the mobile radio can include: a first action button with a preassigned and consistent functionality (e.g., to transit an SOS or other emergency method to all members of a team); and a second, contextually aware, action button whose functionality the mobile radio can modify in response to contextual data accessible to the mobile radio. However, the mobile radio can include fewer or additional action buttons and assign contextually aware functions to any of these action buttons.

The mobile radio can assign many functions to an action button. In one example, the mobile radio can assign a location marking function to the action button. Thus, upon detecting activation of the action button by a user, the mobile radio can: access the mobile radio's current GNSS location; share this GNSS location with other mobile radios in the network of mobile radios; and add this GNSS location to the set of contextual data for influencing button configurations of the mobile radios or other mobile radios within the network of mobile radios.

In another example, the mobile radio can assign an emergency declaration function to the action button. Thus, upon detecting activation of the action button, the mobile radio can update a global state for the team to indicate an emergency state, thereby enabling other mobile radios in the network of mobile radios to update their respective button configuration accordingly.

3.4 Navigation and Control

Generally, as shown in FIGS. 5A-5D, the mobile radio can include additional buttons to enable the user to navigate GUIs displayed by the mobile radio and/or to directly update the contextual data available to the mobile radio, the master mobile radio, and/or the remote computer system. More specifically, the mobile radio can include: volume control buttons or a volume control knob (to adjust the output volume of the mobile radio), menu scroll buttons (to navigate GUIs displayed by the mobile radio), a menu select button (to select an options within GUIs displayed by the mobile radio), a workflow state button (to manually notify the mobile radio of a change in the workflow state of the user), and/or a power button (to turn on or off the power of the mobile radio). Thus, the user of the mobile radio can press any of the abovementioned buttons in order to manually select functions of the mobile radio, manually augment settings of the mobile radio, or otherwise provide manual input to the mobile radio.

4. User Identification

Generally, the mobile radio can identify a user of the mobile radio in order to access a user-specific control profile, which specifies button configurations and a set of trigger conditions for automatically transitioning between these button configurations. More specifically, the mobile radio can execute an authentication process, in response to receiving user credentials at the mobile radio to compare these user credentials to a table of known users of the mobile radios in a network of mobile radios. Thus, the mobile radio can uniquely identify the current user of the mobile radio.

By identifying a specific user among a set of users, the mobile radio enables sharing of mobile radios, such that a mobile radio can be checked in and out by multiple members of a team, and—upon identification—automatically preload the user's latest settings and preferences in the form of a control profile for the user.

In one implementation, the mobile radio can broadcast a radio-frequency identification (or "RFID") query and identify the user based on an RFID value received from a badge or keycard carried by the user. In another implementation, the mobile radio can: prompt a user to say her name aloud; and thus identify the user based on her unique voice signature. In this implementation, the mobile radio can analyze the user's voice, and—in response to the user's voice matching a voice signature associated with her control profile—unlock the mobile radio. In yet another implementation, the mobile radio can receive a username, passcode, and/or another identifier entered manually or selected from a menu by the user of the mobile radio. Thus, the mobile radio can: record a phrase spoken by the user; and execute a voice recognition model based on the phrase spoken by the user to identify the user.

Additionally or alternatively, the mobile radio can include other biometric sensors such as an integrated fingerprint scanner or camera and execute fingerprint identification techniques, facial identification techniques, or retinal identification techniques to uniquely identify the current user of the mobile radio. Furthermore, the mobile radio can access external biometric sensors (e.g., via a connected smartphone or tablet) in order to identify the user via biometric data recorded by these external biometric sensors.

In one variation, the mobile device can: detect an NFC or other shortrange wireless communication from a smartphone executing a companion application; identify the user based on the shortrange wireless communication; and authenticate the user based on the shortrange wireless communication. For example, the smartphone executing the companion application can transmit an encrypted user ID for decryption and authentication by the mobile radio.

Upon identifying the user, the mobile radio can access a user-specific control profile that defines a button configurations and trigger conditions for the mobile radio while operated by the user.

Additionally or alternatively, the mobile radio can identify the user as a generic user not (yet) associated with a unique control profile. In this implementation, the mobile radio can load a generic control profile defining generic or supervisor-defined button functions and trigger conditions.

5. Control Profiles

Generally, in Block S110, the mobile radio can access a control profile, which defines a set of button configurations and a corresponding set of trigger conditions for transitioning between these button configurations. More specifically, the control profile defines: button configurations that each correspond to a workflow state of the user; and sets of trigger conditions that each define, in terms of contextual data, the parameters for detecting each workflow state. Thus, upon detecting a set of trigger conditions that corresponds to a particular workflow state, the mobile radio can access the control profile and load the button configuration corresponding to that workflow state onto the mobile radio, thereby changing the functionality of the buttons of the mobile radio.

The mobile device accesses a control profile based on the identity of the user, which defines a set of workflow states available to the user according to the role of the user within a team. In one example, an emergency medical response team can include members with roles such as an ambulance driver role, a dispatcher role, an EMT role, a paramedic role, and an on-call physician role. Each of these roles corresponds to a control profile that defines the workflow states for the role. For example, a control profile corresponding to the EMT role can define workflow states including an on-call workflow state, a dispatch workflow state, a response workflow state, and a recovery workflow state. In this example, upon detecting that the user is in the dispatch workflow state (by detecting trigger conditions for the dispatch workflow state), the mobile radio can load a button configuration corresponding to the dispatch workflow state that assigns a group to a secondary push-to-talk button including members responding to the same emergency and assigns an action button to display a map depicting the area surrounding the location of the emergency and/or display direction to the location of the emergency based on contextual data.

In one implementation, the mobile radio can access a control profile including: an initial button configuration assigning a first group to a first push-to-talk button and assigning a second group to a second push-to-talk button; and a set of trigger conditions for loading a new button configuration. Thus, in this implementation, the control profile defines an initial button configuration and adaptively determines when to load a new button configuration upon detecting the set of trigger conditions. In this implementation, as further described below, the mobile radio can select members of a new group for assignment to the second push-to-talk button in the new button configuration based on contextual data accessible to the mobile device.

In another implementation, the mobile radio can access a control profile including: an initial button configuration assigning a first group to a first push-to-talk button and assigning a second group to a second push-to-talk button; a first alternate button configuration assigning a third group to the second push-to-talk button; and a set of trigger conditions for loading the first alternate button configuration. In this implementation, the mobile radio includes at least one alternate button configuration that defines a predetermined group for assignment to the second push-to-talk button. Additionally or alternatively, the mobile radio includes at least one alternate button configuration that defines predetermined groups for assignment to the first push-to-talk button.

In another implementation, the mobile radio can access a control profile including: an initial button configuration assigning an action button to a first function; and a set of trigger conditions for loading a new button configuration onto the mobile radio. In this implementation, as further described below, the mobile radio can select a new function for the action button based on contextual data accessible to the mobile radio, upon detecting the set of trigger conditions.

In yet another implementation, the mobile radio can access a control profile including: an initial button configuration assigning an action button to a first function; a first alternate button configuration assigning the action button to a second function; and a set of trigger conditions for loading the first alternate button configuration. In this implementation, the mobile radio includes at least one alternate button configuration that modifies the function of an action button of the mobile devices to a second predetermined function.

In yet another implementation, the mobile radio can access a control profile that includes a button configuration specifying the mode of communication assigned to a push-to-talk button. For example, the mobile radio can access a control profile assigning full-duplex communication to a push-to-talk button or, alternatively, half-duplex communication to a push-to-talk button. The mobile radio can access a control profile that includes trigger conditions corresponding to this type of button configuration such as a voice energy threshold, a volume threshold, or a threshold number of members in a channel. Thus, the mobile radio can, in response to a threshold number of members exceeding a number of members in a group assigned to a push-to-talk button, initiate full-duplex communication between the mobile radio and the group; and, in response to a number of members in the group exceeding the threshold number of members, initiate half-duplex communication between the mobile radio and the group.

Additionally, the mobile radio can access a control profile that includes combinations of the above button configurations. For example, the control profile can include some button configurations that modify groups corresponding to push-to-talk buttons and other button configurations that modify the functionality of action buttons. Thus, the mobile radio can adapt the function of both push-to-talk buttons and action buttons according to a workflow state of the user in order to anticipate the relevant contacts and relevant functions to this user when in the workflow state.

In one implementation, the mobile radio can access a control profile including a default initial button configuration, preselected by the user or a supervisor of the user, which represents a likely initial workflow state of the user. Alternatively, upon accessing a control profile, the mobile radio can first access contextual data to determine an initial workflow state of the user and load a corresponding button configuration onto the mobile radio.

In another implementation, the mobile radio: populates a list of available user workflow states (e.g., based on the control profile); serves this list of workflow states to the user; and prompts the user to select a workflow state from this list, such as through a set of buttons on the mobile radio or through voice controls. Upon receiving a selection of a workflow state from the user, the mobile radio can then load a button configuration corresponding to the selected workflow state onto the mobile radio.

In yet another implementation, a supervisor application executing on a supervisor device, at a remote computer system, or at a master mobile radio can prompt a supervisor or administrator to assign a workflow state to a mobile radio with a newly-identified user. In this implementation, the supervisor application can: prompt the administrator to select a set of mobile radios on a network of mobile radios; and assign a workflow state to each mobile radio in the set of mobile radios according to input from the supervisor. For example, in response to a large quantity of collocated events requiring a rapid response, the supervisor application can prompt a supervisor to select a set of mobile radios on the network by drawing a line around an area (e.g. geofence) on an interactive map displaying both mobile radio locations and incident locations, and—in response to the selection by the administrator—assign each mobile radio in the set of mobile radios in the geofenced area to the same workflow state. Alternatively, the supervisor application can: identify a group of mobile radios with a predetermined threshold distance of the mobile radio of the supervisor; and receive confirmation from the supervisor for this group of mobile radios to be assigned to a particular workflow state.

6. Loading Initial Button Configuration

Generally, upon accessing the control profile including an initial button configuration, the mobile radio can load the initial button configuration onto the mobile radio in Block S120. Thus, the mobile radio can assign an initial function to each of the buttons on the mobile radio.

To configure a push-to-talk button, the mobile radio can generate a push-to-talk channel ID associated with the group assigned to the push-to-talk button and can distribute this push-to-talk channel ID to each mobile radio in the group. Alternatively, the remote computer system can assign a push-to-talk channel ID to a group of users corresponding to push-to-talk buttons on multiple mobile radios in the network of mobile radios. The remote computer system can then identify (e.g., via a lookup table) the particular mobile radios being utilized by each particular user in the group of users and establish an audio communication channel between these mobile radios.

Thus, in response to detecting activation of a push-to-talk button, the mobile radio can initiate communication with the group assigned to the push to talk button by transmitting audio data recorded at the mobile radio (via an integrated microphone of the mobile radio) over the push-to-talk channel assigned to the push-to-talk button in Block S130 and Block S132. Other mobile radios can then receive the transmitted audio data via the push-to-talk channel and can reproduce the audio data via integrated speakers.

7. Accessing Contextual Data

Generally, in Block S140, the mobile radio can access contextual data from a set of sensors—onboard and remote—(e.g., accelerometers, microphones, optical sensors, thermometers, GPS, a Personal Alert Safety System or "PASS" device, a wireless heartrate monitor), as well as from other sources, in order to detect trigger conditions based on this contextual data. More specifically, the mobile radio can access conatextual data, which can include data recorded by the sensor suite of the mobile radio, data recorded by the sensors suites of other mobile radios in the network of mobile radios, data generated via user interaction with the mobile radio or other mobile radios in the network of mobile radios (e.g., functions performed by the mobile radios, communications made, audio data recorded), and/or other available data relevant to the operation of the team (e.g., a current time, a schedule for the team, a map of the area in which the team is operating, current weather data, team states—such as emergency states). Thus, the mobile radio can access contextual data that describes the operation of the network of mobile radios and/or the context within which this network is operating, in order to inform the button configuration of the mobile radio.

In one implementation, each mobile radio in the network of mobile radios operates to individually curate its own set of contextual data—such as by recording data from the sensor suite of the mobile radio and storing these data locally at the mobile radio. The mobile radio can also pull additional contextual data from a remote computer system or from other mobile radios in the network of mobile radios and add these data to the mobile radio's local data repository. The mobile radio can periodically sample its sensor suite and request additional data from the remote computer system or other mobile radios such that the local contextual data repository is up to date.

Alternatively, the mobile radio can access an updated set of contextual data from a centralized data repository stored at a remote computer system or master mobile radio in communication with the network of mobile radios. Thus, each mobile radio in the network of mobile radios can access a single updated set of data describing the context of the whole network.

In another implementation, the mobile radio can define a time buffer (e.g., a time period of a predetermined duration terminating at the current time) for which to retrieve contextual data. For example, the mobile radio can retrieve contextual data representing the last ten minutes of activity in the network of mobile radios. Additionally or alternatively, the mobile radio can access historical sets of contextual data. For example, the mobile radio can access a set of contextual data from one hour before the current time.

In one example, the mobile radio can access contextual data including a location of the mobile radio, such as by sampling the GNSS unit of the mobile radio and recording the current global position output by the GNSS unit. Additionally, the mobile radio can also access contextual data including the current locations of the other mobile radios in the network of mobile radios as measured from the respective GNSS units of each of these mobile radios. Thus, the mobile radio can: detect the presence of the mobile radio or other mobile radios in the network of mobile radios within geofences defined within the operational environment; detect the proximity of the mobile radio or other mobile radios in the network of mobile radios to each other or to points-of-interest defined within the operational environment; and to detect physically collocated groups of mobile radios to aid in adaptively generating groups to assign to the push-to-talk button of the mobile radio.

In another example, the mobile radio can access a current time of day and or a current date, such as via a timing protocol running within the mobile radio, or master clock for the network of mobile radios. Thus, the mobile radio can detect when time-bounded events are occurring. The mobile radio can also access a team schedule defining shift timings, pre-scheduled events, and/or declared events of a specified duration.

In yet another example, the mobile radio can access contextual data including a set of frequent contacts of the mobile radio. The mobile radio can record interactions between the user of the mobile radio and other users in a push-to-talk channel assigned to a push-to-talk button by recording an order of speakers in the group communication. For example, the mobile radio can record communications between the mobile radio and a group in response to activations of the push-to-talk button. Upon recording these communications, if a first user speaks subsequent to a second user and prior to a third user in a group channel, the mobile radio can identify that the first user is directly responding to or querying the second user and the third user respectively, and can count these interactions as a contact between the first user and second user and between the first user and the third user. Additionally, the mobile radio can record one-to-one calls initiated by the mobile radio and record the identity of the recipients of these one-to-one calls as contacts of the user. The mobile radio can tally these contacts to determine a ranking of contacts of the user based on the frequency with which the user communicates with these contacts. Furthermore, the mobile radio can store additional metadata in association with each contact, such as the time of day of each contact, the position of the mobile device during each contact, and/or the workflow state of the user during each contact. Therefore, the mobile radio can associate particular contacts with particular times of day, positions, and/or workflow states and adaptively assign these contacts to a push-to-talk button.

In another example, the mobile radio can access contextual data including audio data from channels corresponding to push-to-talk buttons. The mobile radio can then calculate a voice energy within the channel in order to evaluate whether there is excessive voice traffic within the channel. Additionally or alternatively, the mobile radio can calculate an average volume within the channel in order to evaluate that an emergency or other event may be occurring. The mobile radio can also identify and flag known sounds such as sirens, vehicular sounds, construction equipment sounds in order to evaluate the current workflow state of the user.

In another example, the mobile radio can access contextual data including motion data of the mobile radio—such as by sampling an accelerometer or gyroscope of the mobile radio—and/or motion data of other mobile radios in the network of mobile radios. The mobile radio can derive its velocity, acceleration, orientation, and heading from these motion data, as well as the velocities, accelerations, orientations, and headings of other mobile radios in the network of mobile radios. Thus, the mobile radio can identify a group of users moving together (e.g., within one vehicle or a caravan of vehicles) or converging on a location and adaptively assign these groups of users to a push-to-talk button.

In another example, the mobile radio can access contextual data generated by the activation of action buttons by the mobile radio or by other mobile radios in the network of mobile radios. For example, the mobile radio can access contextual data including locations (i.e., points of interest) marked by any mobile radio in the network of mobile radios. Additionally, the mobile radio can access contextual data such as the current state of the team—such as an emergency state, an on-call state, or an off-duty state. Thus, a first user pressing an action button on one mobile radio can affect the button configurations of other mobile radios in the network of mobile radios due to the additional contextual data recorded as a result of the function corresponding to the action button.

In yet another example, the mobile radio can access contextual data including signal strength data for each mobile radio in the network of mobile radios and/or historical signal strength data for locations proximal to the network of mobile radios. Thus, the mobile radio can, in response to detecting decreased signal strength to a cellular network, change the push-to-talk channel corresponding to a push-to-talk button to utilize another means of communication such as a direct (device-to-device land mobile radio frequency; an available local area network, or a short-range wireless protocol).

In yet another example, the mobile radio can access contextual data including a wireless SSID and/or other network credentials for a local area wireless network corresponding to an area proximal to a mobile radio in the network of mobile radios. Thus, in this example, the mobile radio can: access network credentials for a local area network and an area corresponding to the local area network; and, in response to detecting the presence of the local area network or detecting that the mobile radio is located within the area corresponding to the local area network, access the local area network via the network credentials and reassign a push-to-talk channel to the local area network.

In one implementation, a supervisor application executing on a remote computer system or master mobile radio can access the set of contextual data and display visual representations of these contextual data in order to aid the supervisor in creating new groups and/or configuring the control profiles of the mobile devices in the network of mobile devices.

8. Trigger Conditions

Generally, in Block S150, the mobile radio can detect a set of trigger conditions corresponding to a button configuration before loading the button configuration. More specifically, the mobile radio can: access the set of contextual data; and, in response to detecting a first trigger condition based on the set of contextual data, load a second button configuration assigning a new group to a push-to-talk button or a new function to an action button. Each trigger condition corresponds to a workflow state of a user. For example, the mobile radio can detect a trigger condition corresponding to an emergency response state (e.g., for an EMT), a trigger condition corresponding to an on-duty state (e.g., for a firefighter), or a trigger condition corresponding to an asset protection state (e.g., for security guard). Thus, the mobile radio can detect trigger conditions based on the set of contextual data in order to transfer between workflow states defined by the control profile and reconfigure the button of the mobile device according to the current workflow state.

Generally, the mobile radio can associate trigger conditions with particular workflow states and, therefore, with particular button configurations based on user input, supervisor input, and/or automated processes further described below. In one implementation, the mobile radio can specify trigger conditions in a control profile according to input from a user. Upon identifying a new user, the mobile radio can serve a list of workflow states to the user, and prompt the user to update the trigger conditions corresponding to each workflow state, thereby enabling the user to control the conditions in which the mobile radio reconfigures its buttons. For example, when executing an "EMT" control profile, the mobile radio can enable the user to manually define a geofence-based trigger condition corresponding to a "pre-dispatch" workflow state around a hospital or another dispatch station. Thus, when the mobile radio is present within the user-defined geofence, the mobile radio operates according to the "pre-dispatch" workflow state and loads a corresponding button configuration. In this example, the button configuration corresponding to this "pre-dispatch" workflow state can assign a first push-to-talk button to a dispatch controller and a second push-to-talk button to a friend group.

Additionally or alternatively, a supervisor application executing on a remote computer system or a master mobile radio can prompt a supervisor to enter a set of trigger conditions corresponding to each workflow state, thereby specifying, for the team, the conditions under which each workflow state is automatically detected.

In one implementation, the mobile radio can detect a trigger condition and, in response, assign a push-to-talk button to broadcast to a new group of connected mobile radios over a new channel. For example, a mobile radio executing an "EMT" control profile can: access GNSS location data for the mobile radio in the set of contextual data; detect the mobile radio entering a predefined geofenced area (e.g., a hospital) based on the GNSS location data; access a button configuration corresponding to the trigger condition based on the control profile; and, in accordance with the corresponding button configuration, assign the push-to-talk button to broadcast to all members of a user group within the hospital geofenced area. Thus, the user (i.e., the EMT) can seamlessly begin to communicate with a new set of users without the need to: manually update the settings on her mobile device; or send a request to an administrator (e.g., dispatch) to update the settings on her mobile device.

The mobile radio can detect trigger conditions representing any logical criteria or statistical criteria based on the contextual data. For example, the mobile radio can access control profiles that represent trigger conditions as a set of threshold values for various data in the set of contextual data. In one example, the mobile radio can detect a trigger condition specifying a threshold velocity (or threshold velocity vector) by detecting whether the current velocity (or velocity vector) of the mobile radio exceeds or is less than the threshold velocity (in either magnitude or direction). In another example, the mobile radio can detect a trigger condition specifying a threshold volume by detecting whether the current volume of a channel corresponding to a push-to-talk button exceeds a threshold volume. In yet another example, the mobile radio can detect a trigger condition specifying a threshold number of members included in a single push-to-talk button channel. In another example, the mobile radio can detect a trigger condition specifying a threshold voice energy on a channel corresponding to a push-to-talk button. In another implementation, the mobile radio can detect a trigger condition specifying a threshold distance from a point-of-interest. In another example, the mobile radio can detect a trigger condition specifying a particular time-of-day or scheduled time period by detecting if the current time is concurrent with this time period. Thus, the mobile radio can detect trigger conditions specifying any threshold for a continuous or discrete numerical variable included in the set of contextual data.

In another implementation, the mobile radio can detect trigger conditions based on the value of a binary or categorical variable. In one example, the mobile radio can detect a trigger condition specifying a geofence by detecting whether the mobile radio (or another mobile radio in the network) is located within the geofence. In another example, the mobile radio can detect a trigger condition specifying that an emergency has been declared by accessing the value of an emergency state variable for the team. Thus, the mobile radio can detect trigger conditions specifying any value for any binary or categorical variable included in the set of contextual data.

In yet another implementation, the mobile radio, a remote computer system, or a master mobile radio can detect trigger conditions by evaluating an artificial neural network that receives as input a vector of variables from the set of contextual data and outputs a classification of the current workflow state of the mobile radio. This implementation is described in further detail below.

8.1 Trigger Conditions Generation: Unique User

In one variation, the mobile radio or a remote computer system can autonomously generate trigger conditions corresponding to a workflow state (and the associated button configuration) by training an artificial neural network based on the actions of a unique user. More specifically, the mobile radio can: collect and store contextual data representative of environmental conditions and mobile radio use in association with a recorded manual button configuration change entered manually by the user as a set of training examples; train the artificial neural network via a supervised learning algorithm based on the set of training examples; and define the trained artificial neural network as the set of trigger conditions corresponding to the button configuration. Thus, the mobile radio and/or the remote computer system can implement regression, machine learning, deep learning, artificial intelligence, and/or other methods or techniques to automatically define trigger conditions for various button configurations for a unique user based on contextual data collected in association with manual button configuration changes detected at the mobile radio over time (e.g., when the user's unique profile is loaded onto the mobile radio or when the user's personal connected smartphone is connected to the mobile radio).

In one example, the mobile radio stores contextual data—including location, motion, local weather conditions, ambient noise, ambient light level, pending action request from a supervisor or administrator, and type and proximity of connect mobile radios—to a local buffer (e.g., a 30-second buffer) while in operation. Responsive to the user selecting a new action from a menu of available actions rendered on a display of the mobile radio and assigning the selected action to a first action button on the mobile radio, the mobile radio can: generate a new timestamped button reconfiguration event; write identifiers for the new action and the first action button to the button reconfiguration event; write contextual data from the buffer to the button reconfiguration event; and store this button reconfiguration event with a set of historic button reconfiguration events occurring at the mobile radio and/or at other mobile radios previously operated by the user.

The mobile radio and/or the remote computer system can then: aggregate these button reconfiguration events; implement regression, deep learning, and/or other techniques to derive correlations between scenarios (i.e., combinations of sensor and condition data) and action assignments for the first action button; and then define trigger conditions (e.g., scenarios, combinations of sensor and condition states) for reassigning particular actions to the first action button based on these correlations. The mobile radio (or the companion application, the remote computer system) can: repeat this process for other buttons on the mobile radio and scenarios presenting at the mobile radio; and aggregate trigger conditions for these reconfigurable buttons on the device into one control profile unique to the user.

Later, the same or other mobile radio can: load this control profile when the user is identified at this mobile radio; scan current contextual data in (near) real time for trigger conditions specified in this control profile; and automatically reassign actions to these action buttons, as described above. Alternatively, the mobile radio can: calculate a confidence score for alignment between a trigger condition defined in the control profile and current sensor and condition data; automatically reassign an action to a particular action button according to the control profile if the confidence score exceeds a threshold; and otherwise recommend this action to the user (e.g., by serving a prompt to update the action assigned to the action button) if this confidence score is less than the threshold. Additionally or alternatively, the mobile radio can default to serving recommendations—for action reassignment to action buttons on the mobile radio—to the user based on the control profile, contextual data and only implement these recommended action assignments once confirmed by the user, thereby increasing user control and limiting opportunity for user confusion or frustration due to unexpected action reassignments.

In addition to monitoring manual button configuration changes for action buttons, the mobile radio can also store recorded contextual data in association with recorded changes to groups assigned to push-to-talk buttons manually input by the user. The mobile radio can store contextual data from the data buffer in association with particular groups assigned the push-to-talk button of the mobile radio. Thus, the mobile radio and/or the remote computer system can identify contextual data correlating with particular groups and define a set of trigger conditions for this button configuration.

8.2 Trigger Conditions Generation: Like Users

In another variation, the mobile radio can: identify a new user working in a known user role; and load a control profile created for another unique user working in the same known user role, wherein the control profile created at a separate mobile radio based on contextual data and manual button reconfiguration data associated with the unique user and collected at the separate mobile radio over time. More specifically, the mobile radio can—upon identifying the user as a new user—access a set of control profiles on a shared server; and select a control profile for the new user based on identifiers associated with both the new user and a set of known users (e.g., user role). For example, the mobile radio can: develop a control profile over time for a first user working in an EMT paramedic role, the control profile including a set of updated trigger conditions and button configurations based on the usage by the first user; detect a new user working in an EMT paramedic role; and load the control profile developed for the first user on the mobile radio of the new user, thus enabling the new user to benefit from the data acquired by the mobile radio. Additionally, the mobile radio can identify user characteristics (e.g. left-handed or right-handed) associated with particular preferred button configurations of a set of unique users working across different user roles and prompt a new user having a particular user characteristic to load an associated set of button configurations. For example, the mobile radio can prompt a new user identified as left-handed to load a control profile including a set of button configurations in an inverted orientation from a set of button configurations included in a default control profile.

8.3 Trigger Conditions Generation: Group

In yet another variation, a first mobile radio (and/or the companion application, a remote computer system) executing a control profile for a particular user role can: autonomously create (or "learn," generate, define) trigger conditions for activating various button configurations at the action and other buttons on the mobile radio for the particular user; store these trigger conditions and corresponding button identifiers and button configurations in the user's control profile; and upload this control profile—tagged with the particular user's role—to a remote database. When another (unknown) user in a similar role is assigned to or logs into a second mobile radio (or set of other mobile radios), the second mobile radio can retrieve and implement a copy of this control profile on behalf of the second user. Similarly, the first mobile radio can: identify a user working in an EMT paramedic role; autonomously define trigger conditions for selectively reconfiguring a button (or set of buttons) on the mobile radio (e.g., as described above); scan a set of mobile radios on a shared network for mobile radios executing an EMT paramedic role; and—upon detecting a second mobile radio executing an EMT paramedic role—send the trigger conditions to the second mobile radio executing an EMT paramedic role.

Thus, the method S100 can be executed by a set of mobile radios to enable a team of users working in a shared role to maintain consistent control profiles across the team.

8.4 Trigger Conditions Generation: Administrator/Supervisor

In another implementation, a mobile radio or a remote computer system executing a supervisor application can: aggregate a set of button reconfiguration events across a set of mobile radios associated with the administrator/supervisor; implement regression, deep learning, and/or other techniques to derive correlations between scenarios (i.e., combinations of contextual data) and action assignments for an action button and/or group assignments for a push-to-talk button; and then define trigger conditions (e.g., scenarios, combinations of sensor and condition states) for reassigning particular actions to the first action button or for assigning a different group to the push-to-talk button based on these correlations; and push the trigger conditions to the set of mobile radios associated with the administrator/supervisor. Thus, the mobile radio or the remote computer system can: prompt a supervisor to input the set of trigger conditions; and receive input of the set of trigger conditions.

9. Trigger Condition Detection and Button Reconfiguration

Generally, in Block S150, the mobile radio can detect a trigger condition in the set of trigger conditions based on the set of contextual data corresponding to a particular button configuration and, in response to detecting this trigger condition, reconfigure the mobile radio according to the particular button configuration. More specifically, the mobile radio can execute a series of logical tests based on each trigger condition in the set of trigger conditions until one trigger condition is positively detected (in this implementation, each trigger condition is mutually exclusive). For example, the mobile radio can: load an initial button configuration for a user in an EMT role including assigning a first push-to-talk button to broadcast to a unit dispatch group and assigning a first action button to send command confirmations to a supervisor group; access accelerometer data and GPS data (from the set of contextual data) to detect whether the user is travelling in a vehicle to an offsite location (e.g., a hospital) or whether the user is stationary; and—in response to detecting that the user is travelling in a vehicle to the offsite location—load a second button configuration assigning the first push-to-talk button to broadcast to a triage group at the offsite location. Thus, the mobile radio can classify the current workflow state that best describes a current state of the user of the mobile radio and can, in response, load the button configuration corresponding to the current workflow state onto the mobile radio based on the control profile.

In one implementation, the mobile radio can detect trigger conditions by executing a decision tree classifier generated based on the set of trigger conditions within the control profile. Thus, the mobile radio can minimize the number of logical tests needed to classify the current workflow state of the user of the mobile radio.

In another implementation, instead of performing a series of logical tests, the mobile radio or remote computer system can execute a statistical classification algorithm based on the contextual data, such as an artificial neural network. The mobile radio can generate an input vector based on the set of contextual data and execute the artificial neural network to generate an output vector of confidence scores describing the statistical likelihood of each workflow state specified in the control profile. The mobile radio or remote computer system can then select the workflow state with the greatest score as the workflow state of the user. Thus, the mobile radio or remote computer system can statistically detect trigger conditions corresponding to a particular workflow state of the user of the mobile radio.

9.1 Adaptive Group Generation

Generally, in Block S160, the mobile radio can, upon detecting a trigger condition, adaptively generate (e.g., by selecting members from a set of available members of a team) a new group for assignment to push-to-talk button based on the set of contextual data. For example, the mobile radio can detect that an emergency event is occurring at a particular location and, in response to detecting this trigger condition, generate a group consisting of team members using mobile radios within a predetermined radius of the emergency location. Thus, the mobile radio can adaptively generate groups based on the current operational scenario (as described by the set of contextual data) in order to increase the relevance of groups assigned to push-to-talk buttons of the mobile radio.

In one implementation, the mobile radio generates a group for assignment to a second push-to-talk button by selecting a subset of a group assigned to a first push-to-talk button. In this implementation, the mobile radio can enable the user to select the group assigned to the first push-to-talk button. Therefore, the user may better predict the members that may be assigned to the second push-to-talk button, which can improve usability of the mobile radio.

In one example, the mobile radio, in response to detecting a trigger condition specifying that the mobile radio is currently located within a geofenced area, the mobile radio can generate a group including other members of the team using mobile radios that are also located within the geofenced area. Thus, the mobile radio can assign a group to a push-to-talk button that provides instant communication to members of the team currently located within a geofenced area.

In another example, in response to detecting a trigger condition specifying a threshold distance from a point-of-interest, the mobile radio can generate a group including other members of the team using mobile radios also located within the threshold distance of the point of interest. Thus, the mobile radio can assign a group to a push-to-talk button that provides instance communication to members of the team currently located within a threshold distance of a point of interest.

In yet another example, the mobile radio can, in response to detecting a trigger condition, access a set of contacts from the set of contextual data, and select a group of most frequent contacts corresponding to the current time of day. Thus, the mobile radio can assign a group to a push-to-talk button that preempts the communications the user makes in the normal course of the user's day.

In yet another example, in response to detecting a velocity-related trigger condition (e.g., a velocity threshold), the mobile radio can access motion data for other mobile radios to identify a subset of mobile radios with matching (e.g., to within a threshold proportion) velocities (or accelerations). For example, the mobile radio can detect a velocity threshold trigger condition indicating that the mobile radio is currently moving within a vehicle, the mobile radio can then match its own current velocity with velocities of other mobile radios in use by the team. The mobile radio can then identify other mobile radios that have a substantially similar velocity (e.g., within five percent of magnitude and direction) and, therefore, are likely located within the same vehicle. The mobile radio can then assign this group to a push-to-talk button of the mobile radio. Alternatively, the mobile radio can identify a set of mobile radios that are converging toward a particular location or moving in a similar direction based on the motion data accessed from these mobile radios. Thus, the mobile radio can identify a group of users moving together or toward a common goal and assign to these users a push-to-talk button, thereby enabling single-button communication amongst users that are likely to be working together.

In yet another example, the mobile radio, in response to detecting a trigger condition, can generate a group including an updated set of emergency responders. In this example, a supervisor may, via a supervisor application, update a set of emergency responders (users that are currently on-call to respond to an emergency). Therefore, in response to detecting a trigger condition indicating an emergency state to which the team is responding, the mobile radio can access a set of emergency responders and assign to the mobile radios assigned to these emergency responders a push-to-talk button of the mobile radio.

In yet another example, the mobile radio can access conversational data derived from push-to-talk channels to extract a speaking order and/or to identify acknowledgements between members of a group assigned to a push-to-talk button. Therefore, in this example, the mobile radio can identify, within an existing group assigned to a push-to-talk, a subset of members of the group that frequently communicate amongst themselves. The mobile radio, in response to detecting a trigger condition (e.g., a trigger condition indicating that a first push-to-talk channel assigned to a first push-to-talk button is incurring too much voice traffic), can assign this subset of members of the first push-to-talk channel to a second push-to-talk button for more direct communication (e.g., excluding other members of the first push-to-talk channel).

In another implementation, the mobile radio can, in response to detecting a trigger condition: prompt a supervisor to input a group of users; receive input of the group of users; and identify a group of mobile radios corresponding to the group of users. Thus, the mobile radio can empower a supervisor to quickly dictate the particular groups to be assigned to push-to-talk buttons of mobile radios.

9.2 Configuration Notification and Approval

Generally, in Block S110, the mobile radio can notify the user of a change in button configuration of the mobile radio. More specifically, the mobile radio can provide audio, visual, and/or haptic feedback indicating that the button configuration of the mobile radio is changing, in response to detecting a trigger condition, and/or indicating the particular configuration to which the mobile radio is transitioning. Thus, the mobile radio can ensure that the user of the mobile radio maintains constant awareness of the button configuration of the mobile radio, thereby preventing confusion or misuse of the mobile radio due to unexpected or unnoticed reconfiguration of the mobile radio.

In one implementation, the mobile radio can also seek approval from the user prior to reconfiguring the mobile radio with a new button configuration. More specifically, the mobile radio can: prompt the user to accept the new button configuration; receive input at the mobile radio indicating acceptance of the new button configuration; in response to receiving the input at the mobile radio indicating the acceptance of the new button configuration, loading the new button configuration assigning the third group to the second push-to-talk button at the third time. Thus, the user may dictate whether she approves of the button configuration change in advance, thereby preventing the mobile radio from changing the button configuration against the user's preference.

In another implementation, in response to detecting a trigger condition corresponding to a new button configuration, the mobile radio can output an audio clip via an integrated speaker prior to loading the new button configuration to the mobile radio. In one implementation, the mobile radio: receives a remote command to load a new button configuration from a second mobile radio operated by a user in a supervisor role; outputs an audio clip stating that a new button configuration from a supervisor is queued to load to the mobile device; and prompts the user to approve (or confirm, verify, validate) the new button configuration, such as, by selecting an action button. Then—in response to the user approving the new button configuration—the mobile radio can load the new button configuration.

In yet another implementation, a third mobile radio operated by a supervisor can load a new button configuration to the mobile radio in the absence of approval by the user. In yet another implementation, the mobile radio can restrict a special button on the mobile radio (e.g., an emergency alert button) from any editing by any class of user.

In one example application in which the new button configuration assigns a new group to a push-to-talk button, the mobile radio can generate a verbal announcement of the team members included in the new group assigned to the push-to-talk button. More specifically, for each member of the new group, the mobile radio can announce the member of the group (e.g., by stating the name of the team member or an identifier for the team member) via a synthesized audio message.

In another example in applications in which the new button configuration assigns a new group assigned to a push-to-talk button, the mobile radio can generate an audio announcement at the mobile device including an identifier for the predetermined group (e.g., a group ID or group name).

In one example in which the mobile radio includes multiple push-to-talk buttons, in response to receiving a first communication from a first push-to-talk channel assigned to a first push-to-talk button, the mobile radio can generate a first notification (e.g., audio, visual, or haptic) and, in response to receiving a second communication from a second push-to-talk channel assigned to a second push-to-talk button, the mobile radio can generate a second notification. Therefore, the mobile radio can also label incoming communications from different channels with a notification to prevent confusion of the user between multiple active channels of communication.

9.3 Loading New Button Configuration

Generally, in Block S180, upon notifying the user of the mobile radio of an impending button reconfiguration, the mobile radio can load the new button configuration by: assigning a new group to a push-to-talk button, changing the mode of communication of a push-to-talk channel (from full-duplex to half-duplex or vice versa), or changing the function assigned to an action button, thereby modifying the functionality of the mobile radio in response to contextual data.

Therefore, in Blocks S190, after assigning a new group to a push-to-talk button, in response detecting activation of the push-to-talk button, the mobile radio initiates communication with the new group as opposed to a previous group assigned to the push-to-talk button. Likewise, the mobile radio, after assigning a new function to an action button and in response to detecting activation the action button, executes the new function as opposed to the previous function assigned to the action button.

10. Examples

Blocks of the method S100 can be implemented or executed in a variety of applications to automatically update button configurations for users in various roles.

10.1 EMT

In one example, the mobile radio identifies a smartphone associated with a user working as an EMT; displays a list of user roles associated with the user via a companion application executing on the user's smartphone; and prompts the user to select a user role from the list of user roles.

In response to the user selecting an EMT paramedic role, the mobile radio accesses a control profile—associated with the user and the EMT paramedic role—and loads a base initial button configuration defining: a first contextual action associated with a first push-to-talk button as broadcasting to a geofenced group of networked mobile radios located in an area defined by a particular radius around the mobile radio (e.g., one mile); a second contextual action associated with a first action button as updating a user state to "on call" and sending confirmation of availability to a mobile radio on the user's network associated with a user in an EMT supervisor role; a first default action associated with a second push-to-talk button as broadcasting to a networked group of mobile radios defined by executing EMT dispatch roles; and a second default action associated with a second action button (or associated with a dedicated preference menu button) as accessing a preference menu on the mobile radio.

In response to the user pressing the second action button and navigating through the preference menu to update the action associated with the first push-to-talk button, the mobile radio updates the initial button configuration associated with the user working in the EMT paramedic role to define the first contextual action associated with the first push-to-talk button as broadcasting to a geofenced group of networked mobile radios located in an area defined by a particular radius around a particular location (e.g., the hospital to which the user frequency transports patients), such that the next time the mobile radio (or any mobile radio connected to the mobile radio's network) identifies the user working in the EMT paramedic role, the mobile radio loads the updated initial button configuration associated with user working in the EMT Paramedic role instead of the base initial button configuration associated with a general user working in the EMT Paramedic role. Therefore, the mobile radio can automatically update the user's profile based on user selections.

In response to the user pressing the first action button, the mobile radio updates the user state to "on call" and sends confirmation of availability to the mobile radio on the user's network associated with a user in an EMT supervisor role (or to a companion mobile application running on a mobile device, a supervisor application running of a dispatch console, etc.), which triggers the mobile radio to load a second button configuration defining: a third contextual action associated with the first push-to-talk button as broadcasting to the mobile radio of the user in the EMT supervisor role; the second contextual action associated with the first action button as sending confirmation of availability to a supervisor; a first default action associated with a second push-to-talk button as broadcasting to a networked group of mobile radios defined by executing EMT Dispatch roles; and a second default action associated with a second action button as accessing a preference menu on the mobile radio.

The mobile radio can scan sensor data to identify trigger conditions associated with particular user states for the EMT paramedic (e.g., at scene, transporting patient, performing CPR, arrived at hospital, clear of hospital, etc.) throughout the time period and load particular button configurations associated with each trigger condition and user state. The mobile radio can also load particular button configurations manually triggered by an input from the user during the same time period.

During operation, the mobile radio can scan sensor data to detect a trigger condition indicating that the user is currently transporting a patient, such as: upon detecting an ambulance siren in a live audio stream, detecting active transit on a GPS feed, and determining that the user is performing CPR based on inertial data. Responsive to detecting the user transporting the patient, the mobile radio can load a new contextual action—assigning a command to activate auto-translation mode—to the first action button. Upon detecting selection of the first action button, the mobile radio can: transmit a command to the user's microphone to record, translate, and playback a text-to-voice audio clip of a translation of the patient speaking in a language not associated with the user.

The mobile radio can then scan sensor data to detect a trigger condition indicating that the user is currently arriving at a hospital with a patient, such as: upon detecting the user entering a geofenced area around the hospital on a GPS feed while the user is in a "transporting patient" user state. Responsive to detecting the user arriving at the hospital, the mobile radio can load a new contextual action—assigning a command to broadcast to a geofenced group of mobile radios associated with the hospital—to the first action button. Upon detecting selection of the first action button, the mobile radio can: transmit audio to the geofenced group of mobile radios associated with the hospital.

The mobile radio can then scan sensor data to detect a trigger condition indicating that the user is currently clear of the hospital, such as: upon detecting the user leaving the geofenced area around the hospital on the GPS feed. Responsive to detecting the user leaving the hospital, the mobile radio can load the default button configuration associated with the user working in the EMT paramedic role. Then, in response to the user selecting an action—updating a user state to unavailable—from a menu on the mobile radio, the mobile radio can: record all sensor data from a period preceding the user selecting the action; create a trigger condition based on the sensor data; and create a new button configuration associated with the trigger condition (e.g., assigning "updating a user state to unavailable" to the first action button responsive to detecting the user leaving the hospital). For example, the mobile radio can—responsive to detecting the user leaving the hospital—automatically update the user state to "available for calls mode" and assign the first action button to "update user state to unavailable for calls mode."

10.2 Other Examples

In one variation, the mobile radio can execute Blocks of the method S100 to identify a user in a police officer role. For example, the mobile radio—upon identifying a user in a police officer role—can load a button configuration associated with a user in a police officer role. During operation, the mobile radio can scan sensor data to detect a trigger condition indicating that the user is currently involved in a traffic stop, such as: upon detecting a police siren in a live audio stream, detecting presence on a road shoulder based on a GPS feed, and determining that the user has exited her (stopped) vehicle. Responsive to detecting this traffic stop, the mobile radio can load a first contextual action—assigning a command to activate a body-camera—to the first action button. Upon detecting selection of the first action button, the mobile radio can: transmit a command to the user's body-camera to record video; and reassign a second contextual action—for calling for backup—to the first action button.

In another variation, the mobile radio can execute Blocks of the method S100 to identify a user in a construction worker role. For example, the mobile radio—upon identifying a user in a construction worker role—can: detect a trigger condition (e.g., accelerometer data indicating the user has fallen over) and assign a first contextual action (e.g. call for help) to a first action button.

In another variation, the mobile radio can execute Blocks of the method S100 to identify a user in a security officer role. For example, the mobile radio—upon identifying a user in a security officer role—can: detect a trigger condition (e.g., 20 minutes elapsing since last security check) and assign a first contextual action (e.g. send confirmation area is clear to remainder of security team) to a first action button.

11. Remote Computer System Variation

Although Blocks of the method S100 are primarily described herein as executed by the mobile radio, in one variation shown in FIG. 4, a remote computer system or master mobile radio executes most Blocks of the method S100 and communicates with multiple mobile radios in a network of mobile radios assigned to a team in order to automatically reconfigure these mobile radios according to a centrally-stored contextual data repository. Thus, the remote computer system and/or master mobile radio can track data from across the network of mobile radios and execute more computationally intensive classification processes to identify the workflow state of each user of the team and automatically reconfigure corresponding mobile radios in response to detecting these workflow states.

In this implementation, the remote computer system or master mobile radio can push new button configuration to multiple mobile radios simultaneous ensuring that these new button configurations are synchronized across a team or group. For example, the remote computer system can transmit a new button configuration to the mobile radio of each team member in a first group, such that the new button configuration assigns the first group to a push-to-talk button. Thus, each member of the first group can initiate communication amongst the first group by pressing the same push-to-talk button.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for configuring a mobile radio comprises:
   accessing a control profile comprising:
      an initial button configuration assigning a first group to a first push-to-talk button of the mobile radio; and
      a set of trigger conditions for reconfiguring the mobile radio;
   loading the initial button configuration onto the mobile radio at a first time;
   in response to detecting activation of the first push-to-talk button at a second time succeeding the first time, initiating communication between the mobile radio and the first group;
   accessing a set of contextual data representing an operational scenario of the mobile radio;
   detecting a first trigger condition, in the set of trigger conditions, based on the set of contextual data;
   in response to detecting the first trigger condition:
      generating a second group based on the set of contextual data;
      notifying a user of the mobile radio of reassignment of the first push-to-talk button; and
      assigning the second group to the first push-to-talk button at a third time; and
   in response to detecting activation of the first push-to-talk button at a fourth time succeeding the third time, initiating communication between the mobile radio and the second group.

2. The method of claim 1:
   wherein accessing the control profile comprises accessing the control profile comprising the set of trigger conditions, the set of trigger conditions comprising the first trigger condition defining a geofence;
   wherein accessing the set of contextual data comprises accessing locations of a set of mobile radios comprising a location of the mobile radio;
   wherein detecting the first trigger condition based on the set of contextual data comprises detecting presence of the mobile radio within the geofence based on the location of the mobile radio and the geofence; and
   wherein generating the second group based on the set of contextual data comprises generating the second group comprising a subset of mobile radios, in the set of mobile radios, present within the geofence based on the locations of the set of mobile radios.

3. The method of claim 1:
   wherein accessing the control profile comprises accessing the control profile comprising the set of trigger conditions, the set of trigger conditions comprising the first trigger condition defining a point-of-interest;
   wherein accessing the set of contextual data comprises accessing locations of a set of mobile radios comprising a location of the mobile radio;
   wherein detecting the first trigger condition based on the set of contextual data comprises detecting presence of the mobile radio within a threshold distance of the point-of-interest based on the location of the mobile radio and the point-of-interest; and
   wherein generating the second group based on the set of contextual data comprises generating the second group comprising a subset of mobile radios, in the set of mobile radios, within the threshold distance of the point-of-interest based on the locations of the set of mobile radios.

4. The method of claim 1:
   wherein accessing the control profile comprises accessing the control profile comprising the set of trigger conditions, the set of trigger conditions comprising the first trigger condition defining a scheduled time of day;
   wherein accessing the set of contextual data comprises accessing a current time of day and a set of frequent contacts corresponding to the current time of day;
   wherein detecting the first trigger condition based on the set of contextual data comprises detecting a match between the scheduled time of day and the current time of day; and
   wherein generating the second group based on the set of contextual data comprises generating the second group comprising the set of frequent contacts corresponding to the current time of day.

5. The method of claim 1:
   wherein accessing the control profile comprises accessing the control profile comprising the set of trigger conditions, the set of trigger conditions comprising the first trigger condition defining a threshold velocity;
   wherein accessing the set of contextual data comprises accessing current velocities of a set of mobile radios comprising a current velocity of the mobile radio;

wherein detecting the first trigger condition based on the set of contextual data comprises detecting the current velocity of the mobile radio exceeding the threshold velocity; and
wherein generating the second group based on the set of contextual data comprises generating the second group comprising a subset of mobile radios, in the set of mobile radios, characterized by matching velocities similar to the current velocity based on the current velocities of the set of mobile radios.

6. The method of claim 1:
wherein accessing the set of contextual data comprises:
recording communications between the mobile radio and the first group in response to activations of the first push-to-talk button between the first time and the third time; and
identifying a set of frequent contacts within the first group based on the communications between the mobile radio and the first group; and
wherein generating the second group based on the set of contextual data comprises generating the second group comprising the set of frequent contacts.

7. The method of claim 1:
wherein notifying the user of the mobile radio of reassignment of the first push-to-talk button comprises prompting the user of the mobile radio to accept assignment of the second group to the first push-to-talk button;
further comprising receiving input at the mobile radio indicating acceptance of the assignment of the second group to the first push-to-talk button; and
wherein assigning the second group to the first push-to-talk button comprises, in response to receiving the input at the mobile radio indicating the assignment of the second group to the first push-to-talk button, assigning the second group to the second push-to-talk button.

8. The method of claim 1:
wherein accessing the control profile comprises accessing the control profile, the control profile comprising the initial button configuration assigning the first group to the first push-to-talk button of the mobile radio and assigning a third group to a second push-to-talk button of the mobile radio, the first group comprising a first subset of the third group;
further comprising, in response to detecting activation of the second push-to-talk button prior to the third time, initiating communication between the mobile radio and the third group;
wherein generating the second group based on the set of contextual data comprises generating the second group based on the set of contextual data, the second group comprising a second subset of the third group different from the first subset; and
further comprising, in response to detecting activation of the second push-to-talk button after the third time, initiating communication between the mobile radio and the third group.

9. The method of claim 1:
wherein accessing the control profile comprises accessing the control profile comprising:
the initial button configuration assigning the first group to the first push-to-talk button of the mobile radio and assigning a one-to-one calling function to an action button of the mobile radio; and
the set of trigger conditions comprising the first trigger condition defining a threshold one-to-one calling rate;
further comprising, in response to detecting activation of the action button, initiating a one-to-one call from the mobile radio to a recipient;
wherein accessing the set of contextual data comprises:
accessing a one-to-one calling rate during a time buffer; and
accessing a set of frequent recipients of one-to-one calls during the time buffer;
wherein detecting the first trigger condition based on the set of contextual data comprises detecting the one-to-one calling rate exceeding the threshold one-to-one calling rate; and
wherein generating the second group based on the set of contextual data comprises generating the second group comprising the set of frequent recipients.

10. The method of claim 1:
wherein accessing the control profile associated with the user comprises accessing the control profile comprising:
the initial button configuration assigning the first group to the first push-to-talk button of the mobile radio and assigning a location marking function to an action button of the mobile radio; and
the set of trigger conditions comprising the first trigger condition defining detection of a marked location;
further comprising, in response to detecting activation of the action button, generating a marked location at a location of the mobile radio;
wherein accessing the set of contextual data comprises:
accessing the marked location of the mobile radio; and
accessing a set of current locations of the first group;
wherein detecting the first trigger condition based on the set of contextual data comprises detecting the marked location of the mobile radio; and
wherein generating the second group based on the set of contextual data comprises generating the second group comprising a subset of the first group within a threshold distance of the marked location.

11. A method for configuring a mobile radio comprises:
accessing a control profile comprising:
an initial button configuration assigning a first group to a first push-to-talk button of the mobile radio and assigning a second group to a second push-to-talk button of the mobile radio, the second group comprising a first subset of the first group;
a first alternate button configuration assigning a third group to the second push-to-talk button, the third group comprising a second subset of the first group different from the first subset; and
a set of trigger conditions comprising a first trigger condition corresponding to the first alternate button configuration;
loading the initial button configuration onto the mobile radio at a first time;
in response to detecting activation of the first push-to-talk button at a second time succeeding the first time, initiating communication between the mobile radio and the first group;
in response to detecting activation of the second push-to-talk button at a third time succeeding the first time, initiating communication between the mobile radio and the second group;
accessing a set of contextual data representing an operational scenario of the mobile radio;
detecting the first trigger condition based on the set of contextual data;
in response to detecting the first trigger condition:

notifying a user of a transition from the initial button configuration to the first alternate button configuration; and
loading the first alternate button configuration onto the mobile radio at the third time;
in response to activation of the first push-to-talk button at a fourth time succeeding the third time, initiating communication with the first group; and
in response to activation of the second push-to-talk button at a fifth time succeeding the third time, initiating communication with the third group.

12. The method of claim 11:
wherein, in response to detecting activation of the second push-to-talk button at the second time, initiating communication between the mobile radio and the second group comprises, in response to a number of members in the second group exceeding a threshold number of members, initiating half-duplex communication between the mobile radio and the second group; and
wherein, in response to detecting activation of the second push-to-talk button at the fifth time, initiating communication between the mobile radio and the third group comprises, in response to the threshold number of members exceeding a number of members in the third group and, in response to detecting activation of the second push-to-talk button at the fifth time, initiating full-duplex communication between the mobile radio and the third group.

13. The method of claim 11:
accessing the control profile comprises accessing the control profile comprising:
the first alternate button configuration assigning the third group to the second push-to-talk button, the third group comprising the second subset of the first group, the second subset smaller than the first subset; and
the set of trigger conditions comprising the first trigger condition corresponding to the first alternate button configuration and defining a voice energy threshold;
wherein accessing the set of contextual data comprises accessing an average voice energy amongst the first group and the mobile radio during a time buffer;
wherein detecting the first trigger condition based on the set of contextual data comprises detecting the average voice energy exceeding the voice energy threshold.

14. The method of claim 11:
wherein accessing the control profile comprises accessing the control profile comprising the set of trigger conditions comprising the first trigger condition corresponding to the first alternate button configuration and defining a volume threshold;
wherein accessing the set of contextual data comprises accessing audio data recorded by the mobile radio; and
wherein detecting the first trigger condition based on the set of contextual data comprises detecting the audio data exceeding the volume threshold.

15. The method of claim 11:
further comprising:
in response to detecting activation of the first push-to-talk button, recording a phrase spoken by the user; and
executing a voice recognition mode based on the phrase spoken by the user to identify the user of the mobile radio;
wherein accessing the control profile comprises accessing the control profile associated with the user and comprising:

the initial button configuration assigning the first group to the first push-to-talk button and assigning the second group to the second push-to-talk button, the second group comprising the first subset of the first group;
the first alternate button configuration assigning the third group to the second push-to-talk button, the third group comprising the second subset of the first group different from the first subset; and
the set of trigger conditions comprising the first trigger condition corresponding to the first alternate button configuration.

16. The method of claim 11:
wherein accessing the control profile associated with the user comprises accessing the control profile comprising:
the initial button configuration assigning the first group to the first push-to-talk button, assigning the second group to the second push-to-talk button, and assigning an emergency declaration function to an action button of the mobile radio;
the first alternate button configuration assigning the third group to the second push-to-talk button, the third group comprising an emergency response team; and
the set of trigger conditions defining an emergency state trigger condition;
wherein accessing the set of contextual data comprises:
detecting activation of the action button; and
defining an emergency state for the first group; and
wherein detecting the first trigger condition based on the set of contextual data comprises detecting the emergency state for the first group.

17. The method of claim 11, wherein notifying the user of the transition from the initial button configuration to the first alternate button configuration comprises, for each member of the second group, audibly announcing the member at the mobile radio at approximately the third time.

18. A method for configuring a set of mobile radios:
accessing a control profile comprising:
an initial button configuration:
assigning a set of users, of the set of mobile radios, to a first push-to-talk button of each radio in the set of mobile radios;
assigning a first subset of users in the set of users, of a first subset of mobile radios in the set of mobile radios, to a second push-to-talk button of each mobile radio in the set of mobile radios; and
a set of trigger conditions comprising a first trigger condition corresponding to a new button configuration;
at a first time, loading the initial button configuration onto the set of mobile radios;
in response to detecting activation of the first push-to-talk button of a first mobile radio in the set of mobile radios at a second time succeeding the first time, initiating communication amongst the set of mobile radios;
in response to detecting activation of the second push-to-talk button of a second mobile radio in the set of mobile radios at a third time succeeding the first time, initiating communication amongst the first subset of mobile radios;
accessing a set of contextual data associated with an operational scenario of the set of mobile radios;
detecting the first trigger condition based on the set of contextual data;
in response to detecting the first trigger condition:

notifying the first subset of users of a transition from the initial button configuration to the new button configuration, the new button configuration assigning a second subset of users of a second subset of mobile radios in the set of mobile radios to the second push-to-talk button; and at a fourth time, loading the new button configuration onto the second subset of mobile radios;

in response to detecting activation of the first push-to-talk button of a third mobile radio in the set of mobile radios at a fifth time succeeding the fourth time, initiating communication amongst the set of mobile radios; and in response to detecting activation of the second push-to-talk button of the third mobile radio in the second subset of mobile radios at a sixth time succeeding the fourth time, initiating communication amongst the second subset of mobile radios.

19. The method of claim 18, further comprising, at a supervisor device:

prompting a supervisor to input the set of trigger conditions;

receiving input of the set of trigger conditions;

displaying a representation of the set of contextual data;

prompting the supervisor to input the second subset of users; and receiving input of the second subset of users.

20. The method of claim 18:

wherein, at the fourth time, loading the new button configuration onto the second subset of mobile radios comprises:

loading the new button configuration onto the second subset of mobile radios; and loading a second new button configuration onto a third subset of mobile radios comprising the first subset of mobile radios excluding the second subset of mobile radios, the second new button configuration assigning the second push-to-talk button to a third subset of users of the third subset of mobile radios.

\* \* \* \* \*